Sept. 11, 1956
W. DENNIS
2,762,208
SEPARATION OF THE CONSTITUENTS OF AIR
Filed Dec. 19, 1952
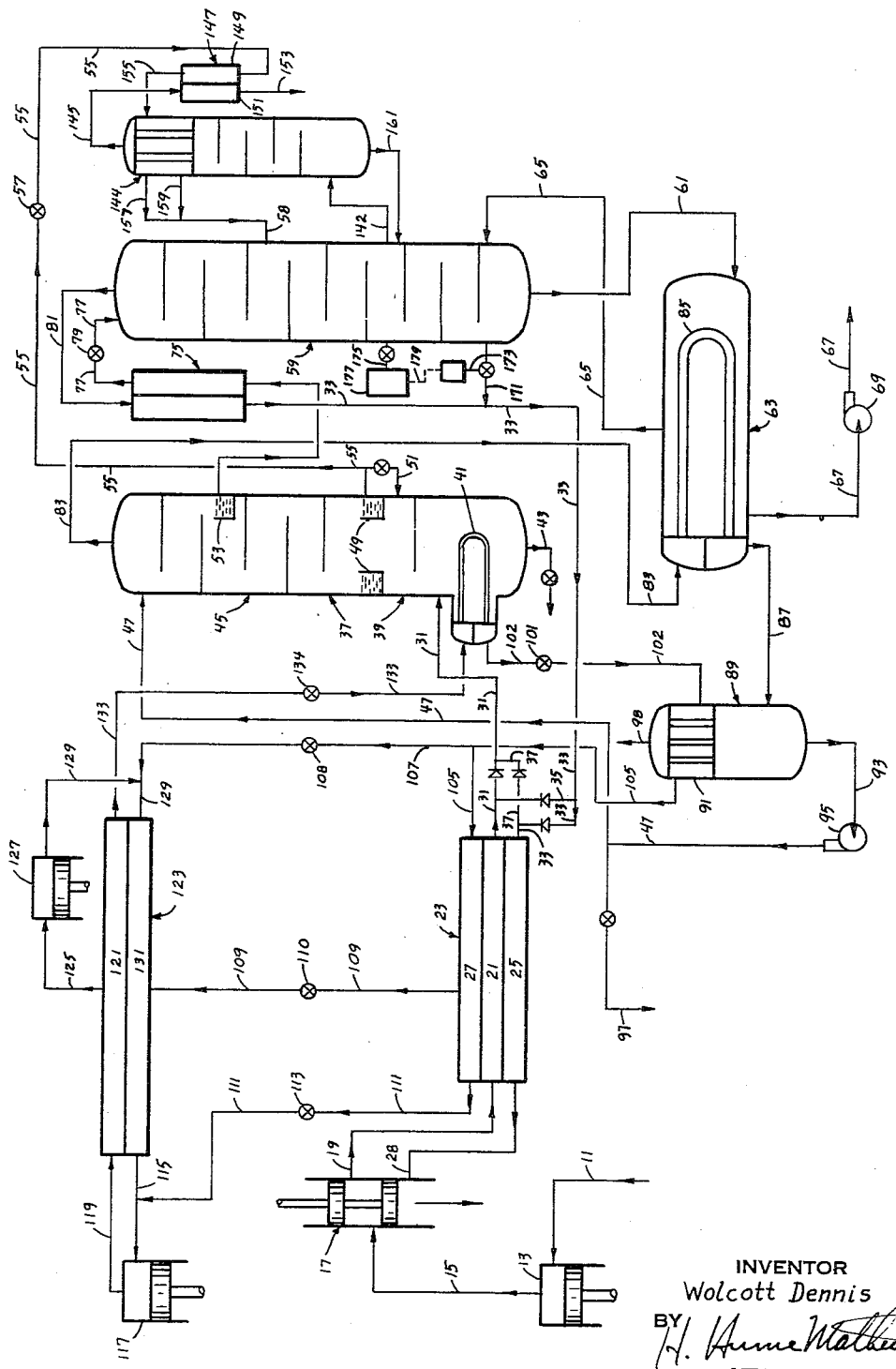
INVENTOR
Wolcott Dennis
BY
ATTORNEY

United States Patent Office 2,762,208
Patented Sept. 11, 1956

2,762,208

SEPARATION OF THE CONSTITUENTS OF AIR

Wolcott Dennis, Scotch Plains, N. J., assignor to Air Reduction Company, Incorporated, New York, N. Y., a corporation of New York Application December 19, 1952, Serial No. 326,985

16 Claims. (Cl. 62—122)

This invention relates to the separation of gases by liquefaction and more particularly concerns the separation of air into a high purity liquid oxygen product, a high purity liquid nitrogen product and other constituents of air.

In recent years the increased demands for oxygen have made it economical to produce and to transport oxygen, as a liquid, in and from, a plant which is located centrally in respect to the consumers who are more numerous and/or have larger needs for oxygen. There is also an appreciable demand for high purity nitrogen in liquid phase. However, in most commercial plants today the separation process is so arranged and operated that either high purity oxygen is produced or high purity nitrogen is produced. Normally the production of high purity oxygen and high purity nitrogen is not accomplished simultaneously without the addition of a nitrogen attachment and independent controls.

It is the primary object of this invention to provide an improved process and apparatus which will produce both high purity liquid oxygen and limited quantities of high purity liquid nitrogen at the same time in an efficient and economical manner.

The use of, and the proposals for the use of, reversing heat exchangers for refrigerating incoming air and so removing impurities, such as carbon dioxide, and closed nitrogen recycles for the major refrigeration requirements of an air separation process have been more common of late since the advantages which accrue therefrom have been better appreciated and better known. A problem involved in the use of reversing exchangers is the effective sublimation or removal of deposited low boiling constituents of air, such as carbon dioxide, from the reversing exchanger so that the exchanger will not become plugged. This problem results from the inherent heat exchange conditions in the efficient operation of the exchanger as explained in Ruheman's book entitled Gas Separation (1949).

It is a further object of this invention to combine a refrigerating closed nitrogen recycle with a reversing heat exchanger in a manner which will overcome the problem of removing deposited substances, such as carbon dioxide, from the reversing exchanger.

Another object is to integrate a closed nitrogen recycle with an air separation process in such a manner that high purity liquid oxygen and high purity liquid nitrogen are produced in accordance with the above primary object.

It is a further object to provide an improved method and apparatus for separating air into high purity liquid oxygen, high purity liquid nitrogen and other air constituents including liquid argon, gaseous neon, and a krypton-xenon fraction.

An additional object is to provide means for obtaining a desired concentration of argon in an oxygen column at the point where an argon concentrate is passed to an argon column.

Another object is to provide an improved, separated arrangement of apparatus which is suitable to scrub residual impurities from air, to produce high purity liquid oxygen and high purity liquid nitrogen and yet does not require high protective buildings.

In the process and apparatus in which the instant invention is incorporated, air is passed through a reversing exchanger in which the air is refrigerated by waste nitrogen and recycle nitrogen and so impurities, such as carbon dioxide, are deposited and removed from the air. Upon reversal of the flow paths of the waste nitrogen and the incoming air, the waste nitrogen effectively removes the deposited substances because proper temperature levels are provided in the reversing exchanger by means of a suitable bleed-off and return of some of the refrigerating recycle nitrogen from the non-reversing passage of the exchanger to the nitrogen recycle exchanger.

The refrigerated incoming air is next scrubbed by rich liquid in the lower portion of the high pressure column where the liquid portion of the incoming air is boiled by high pressure recycle nitrogen and a purge fraction containing krypton and xenon is removed from the bottom of the scrubber, along with impurities.

Thereafter the scrubbed air is rectified into high purity nitrogen effluent, reflux liquid nitrogen and oxygen-enriched liquid air (rich liquid) in the upper portion of the high pressure column. The nitrogen effluent is partially condensed by heat exchange with high purity liquid oxygen in a separate reboiler which is connected to the bottom of the oxygen column. Condensation of the nitrogen effluent from the nitrogen column is completed in a separate nitrogen condenser which is refrigerated by expanded recycle nitrogen from the boiler of the scrubber. This condensation step results in the separation of a gaseous off-take which contains constituents of air which are more volatile than nitrogen, principally neon. The majority of the condensed effluent is returned to the top of the nitrogen column as reflux in order to produce high purity nitrogen without the use of a large number of vapor-liquid-contact plates. The small remainder of the completely condensed, high purity nitrogen effluent is available for sale as liquid.

After completing the condensation of the nitrogen effluent, the expanded recycle nitrogen is divided and utilized for refrigerating the incoming air (as mentioned) and for refrigerating the compressed recycle nitrogen in the recycle nitrogen exchanger. Part of the compressed nitrogen is removed from the warm passage of the recycle exchanger and is cooled by passing through an expansion engine. This expanded recycle nitrogen is then passed through the cold passage of the recycle exchanger in order to refrigerate the remainder of the compressed recycle nitrogen which then passes on to the scrubber boiler and nitrogen effluent condenser. The exhaust from expansion engine, in passing through the cold passage of the recycle exchanger, is joined, at the location where it left the warm passage, by the recycle nitrogen bleed-off from the reversing exchanger in order that proper heat transfer conditions can be maintained.

The two products from the high pressure column which are processsed further are the reflux liquid nitrogen which collects at an intermediate level in the upper portion of the column and the rich liquid which collects in the bottom of the upper portion of the high pressure column.

The rich liquid is expanded and then rectified in the oxygen column and the oxygen reboiler connected thereto into waste nitrogen and high purity liquid oxygen. This rectification is effected by means of the reflux liquid nitrogen and the high presure high purity nitrogen effluent which boils the high purity liquid oxygen in the reboiler.

At the proper point in the oxygen column, an argon concentrate containing principally argon and oxygen is passed to the argon column or attachment for separation into crude argon and residual liquid oxygen. This separation is effected in part by passing the expanded rich liquid from the high pressure column, prior to its admission to the oxygen column, through the argon condenser in the top of the argon attachment where the rich liquid condenses the oxygen from the argon concentrate. Before entering the condenser of the argon column, the rich liquid is utilized to liquefy the gaseous crude argon from the argon column so that the argon product is in a form which is more suitable for small volume storage. The proper concentration of argon at the point of withdrawal is maintained by bleeding off a small amount of gaseous oxygen from a point above the pool of liquid oxygen in the oxygen column.

The accomplishment of the above objects and others, along with the advantages and features of the invention, will be more readily apparent from the following description and the appended drawing.

Referring to the schematic drawing, it can be seen that reference numeral 11 is applied to the air inlet conduit. Conduit 11 passes air to compressor 13 where the air is compressed to about 100 p. s. i. a. Thereafter the compressed air is cooled to about 80° F. by conventional coolers (not shown). The compressed air after flowing from compressor 13 through conduit 15, reversing valve 17 and conduit 19 enters passage 21 of reversing exchanger 23. In flowing through passage 21, the air is cooled to approximately its liquefaction temperature (about —280° F.) by heat exchange with counter-current flowing streams of waste nitrogen in passage 25 and of recycle nitrogen in passage 27 of reversing heat exchanger 23. Exchanger 23 is comprised of two reversing passages 21 and 25 and one non-reversing passage 27 and is suitably designed to effect efficient indirect heat exchange between the respective streams of air, waste nitrogen and recycle nitrogen. In acordance with the illustrated setting of valve 17, the waste nitrogen is shown as leaving passage 25 of exchanger 23 by means of conduit 28, passing through valve 17, and being discharged to the atmosphere. As is conventional in the art, means are provided to reverse or alternate the flow of air and waste nitrogen in the passages 21 and 25 in order that removal of carbon dioxide and other impurities which are deposited from the incoming air can be accomplished by the waste nitrogen in addition to the indirect cooling of the air by waste nitrogen. This waste nitrogen is derived in the separation process in a manner to be explained hereinafter.

The means for reversing the flows of waste nitrogen and air in passages 25 and 21 comprises the reversing valve 17, a timing system (not shown), and suitable check valves 29 in the various conduits leading from and to the cold end of the reversing exchanger 23. The timing system can be any conventional means suitable for properly operating the reversing valve 17 on a predetermined time cycle and, in the interest of clarity, has not been shown.

Two of the previously-mentioned check valves 29 are located in the two conduits 31 and 33 which are shown respectively as passing air from exchanger 23 towards the separation process and as bringing waste nitrogen from the separation process to the exchanger 23. A branch conduit 35 having check valve 29 joins waste nitrogen conduit 33 upstream from its check valve and extends to, and joins, the air conduit 31 downstream from its check valve. Another branch conduit 36 provides part of the alternate flow path for air from a point downstream of the check valve in conduit 33 to a point upstream of the check valve in conduit 31. With this arrangement, it is apparent that air can alternately flow through passages 21 and 25 of the exchanger upon reversal of valve 17 and that waste nitrogen flows in the passage not being used by air.

After being cooled in exchanger 23, the air vapor flows to the high pressure column 37, enters the lower scrubber section 39 thereof where the air is at about 94 p. s. i. a. and passes up through conventional contact trays counter- current to oxygen-enriched liquid air. This scrubbing operation removes any traces of high boiling constituents or impurities from the air, which traces may have passed through exchanger 23. The scrubber liquid in the bottom of the scrubber is boiled or revaporized by the fluid in boiler 41 and a small portion of the scrubber liquid having the impurities concentrated therein is purged from the bottom of the scrubber 39 by means of valved conduit 43. It is to be noted that by the action which occurs in scrubber 39, krypton and xenon in the air are removed therefrom and pass out of scrubber 39 in the purge liquid passing through conduit 43, rather than flowing on through the process. This purge can be suitably treated to obtain the krypton and xenon, if desired, as a separated rare gas product.

Air vapor from the scrubber 39 passes up into the nitrogen rectifier section 45 of the high pressure column 37 where it is rectified into high purity nitrogen effluent by means of conventional contact trays and the liquid nitrogen reflux which enters the top of nitrogen rectifier 45 through pipe 47. Due to this rectification, liquid air enriched in oxygen (rich liquid) collects in annular trough 49 in the bottom of rectifier section 45. Part of this liquid is used for the above-mentioned scrubbing operation and enters the scrubber 39 by means of valved pipe 51 extending from a conduit connected to the top level of the trough 49 to the scrubber 39. Approximately half-way down the rectifier 45, liquid nitrogen (which is not as pure as the nitrogen vapor in the top of the rectifier) results from the rectification and part of this less pure nitrogen is collected in a suitable device 53, disposed at an intermediate level of rectifier 45.

From the foregoing it is clear that the products of the nitrogen rectifier 45 are high purity nitrogen in the top of the rectifier, less pure liquid nitrogen in collecting device 53 and oxygen-enriched liquid air in trough 49. Except for the portion of enriched liquid air which passes through conduit 51 and is used in scrubber 39, this rich fluid is passed through conduit 55, its expansion valve 57, certain argon apparatus (including the reflux condenser of argon attachment 140) and conduit 58 to the upper portion of the oxygen column 59. This oxygen column fed at about 18 p. s. i. a. is rectified in oxygen column 59, having the conventional tray-contact construction, into waste nitrogen vapor in the top and a pool of liquid oxygen in the bottom. This liquid oxygen at about —291° F. is withdrawn with the aid of gravity from the bottom of rectifier 59 by means of conduit 61 and is passed to the oxygen reboiler 63 where it is partially reboiled to give high purity liquid oxygen. The vapor which is thus formed is returned to oxygen column 59 by means of conduit 65 which empties into the oxygen column adjacent the bottom but above the pool of liquid oxygen therein. The net liquid oxygen produced in reboiler 53 is removed therefrom by conduit 67 and a suitable liquid oxygen pump 69 as the high purity liquid oxygen product of the process.

The rectification which occurs in oxygen column 59 is refluxed by the above-mentioned, somewhat impure liquid nitrogen which is collected by collecting device 53 in nitrogen rectifier 37. This liquid nitrogen flows through conduit 73 from collector 53 to subcooler 75 where it is subcooled by waste nitrogen from the oxygen column prior to its refluxing. By conduit 77 this subcooled liquid nitrogen is passed to expansion valve 79 where this liquid is expanded to about 18 p. s. i. a. and then it is introduced into the top of column 59 as reflux.

The waste nitrogen vapor at about —317° F. from the top of oxygen column 59 passes through conduit 81 to subcooler 75 where it effects the above-mentioned subcooling of the impure liquid nitrogen which refluxes the oxygen column. Thereafter this waste nitrogen at about —290° F. flows by pipe 33 to the reversing exchanger 23 to effect the previously described refrigeration of incoming air.

Considering now the high purity nitrogen at about −285° F. which is produced in the top of the nitrogen column 37, it can be seen on the drawing that a conduit 83 extends from the top of high pressure column 37 to the interior passage 85 of the oxygen reboiler 63 so that the high purity nitrogen is partially condensed by boiling the liquid oxygen in the space which surrounds the interior passage 85. After this partial condensation, the nitrogen is transferred by pipe 87 to the nitrogen condenser 89. Condensation of this nitrogen is completed in condenser 89 by heat being abstracted by the recycle nitrogen at about 60 p. s. i. a. in the upper section 91 of the condenser 89. Most of this condensed liquid nitrogen is then delivered for reflux to the top of high pressure column 37 by conduit 93, liquid nitrogen pump 95, and conduit 47. Part of the liquid nitrogen at about 90 p. s. i. a. can be withdrawn as a high purity nitrogen product by means of valved pipe 97 which connects to conduit 47 downstream of the liquid nitrogen pump 95.

It can be noted at this point that, by condensing the entire gaseous nitrogen effluent from the nitrogen column 37 by passing it through the oxygen reboiler 53 and the nitrogen condenser 89, then returning most of this condensate to the nitrogen column 37 as reflux, and taking the reflux for the oxygen column 59 from the nitrogen column 37 at the location of the collector 53, the production of high purity nitrogen is effected without the use of a large number of contact trays and controls.

The condenser 89 also serves to separate out the neon and other similar gases since these gases will tend not to be condensed as is the nitrogen effluent. Since these gases are more volatile than nitrogen, they will pass to the top of the condenser 89 and are removed by conduit 98. This separation of neon and other gases, besides being a worthwhile recovery, also serves to maintain a high purity nitrogen since the neon, for example, is purged from the nitrogen and the system.

As above mentioned, the incoming air is compressed to about 100 p. s. i. a. in compressor 13. At this pressure the air, of course, does not have sufficient energy to provide the refrigeration required; therefore the well-known nitrogen recycle is added to the system in a particular manner to furnish this necessary refrigeration. This nitrogen recycle has been mentioned above in reference to the scrubber boiler 41 and condenser 89. The minor flow of the gaseous recycle nitrogen at about −270° F. enters this boiler 41 and, after boiling enriched liquid scrubbing air and so being liquefied passes through expansion valve 101 in conduit 102 which is connected to boiler 41 and leads to nitrogen condenser 89. After expanding through valve 101 to about 4 atmospheres gauge pressure and moving into the upper section 91 of the condenser 89, this recycle nitrogen flow is completely evaporated by condensing the nitrogen effluent entering condenser 89 by means of conduit 87.

After effecting the condensation of the nitrogen effluent in condenser 89, the evaporated recycle nitrogen or minor flow of nitrogen leaves condenser 89 through conduit 105 and is divided into two parts by means of conduit 107 which joins conduit 105. The part of the evaporated recycle nitrogen which flows in conduit 107 having control valve 108 is utilized in the nitrogen recycle in a manner which will be subsequently explained. The residual part of the evaporated nitrogen which flows on in conduit 105 passes to the non-reversing passage 27 of the reversing exchanger 23 to effect part of the previously-mentioned cooling the incoming air, along with the waste nitrogen flowing in either passage 25 or 21. A small portion of the recycle nitrogen flow in passage 27 is withdrawn through conduit 109 at a point approximately two-thirds of the way up the exchanger from the entrance of conduit 105. This withdrawn nitrogen passes through conduit 109 and its control valve 110 and enters passage 131 of the exchanger 123 at a point opposite where the compressed nitrogen to be expanded leaves passage 121 for expander 127. The reason for this withdrawal will be explained shortly. The major or larger portion of the residual part of evaporated recycle nitrogen continues through the passage 27 of the exchanger and leaves through conduit 111 having a control valve 113. This larger portion of recycle nitrogen next joins an augmented major flow of recycle nitrogen moving in conduit 115 which leads to the nitrogen recycle compressor 117 and thus forms a full nitrogen recycle flow. The full flow is compressed by, and discharged from, compressor 117 into conduit 119 at pressure of about 2500 p. s. i. a. Conventional water-cooled heat exchangers (not shown) lower the temperature of the recycle nitrogen to about 80° F. Conduit 119 passes the nitrogen to passage 121 of the high pressure recycle exchanger 123 where the full flow is initially cooled by the augmented expanded, major flow. At a point in passage 121 where the compressed nitrogen is at a temperature of about −30° F., a major flow of the high pressure stream or full flow of nitrogen is withdrawn through conduit 125 and expanded more or less isentropically in a conventional expansion engine 127 to about 4 atmospheres gauge with the performance of external work. This cold expanded major flow is directed by conduit 129 to passage 131 of the high pressure recycle nitrogen exchanger 123 where it effects cooling of the counter-flowing compressed minor flow of nitrogen in passage 121. In this manner the minor flow of the compressed nitrogen which remains, after the major flow leaves passage 121 for expansion, continues through 121 and is further cooled. From passage 121, this minor flow passes through conduit 133, having valve 134 which suitably reduces the pressure of the nitrogen (preferably to about 160 p. s. i. a.), to the boiler 41 in scrubber 39 where it is further cooled as above described. Os above mentioned, the throttled minor flow is divided after condenser 89 into two parts at the juncture of conduits 105 and 107. The part in conduit 107 is added to the exhaust from the expansion engine and thereby forms the augmented expanded major flow which moves through passage 131 while the residual part flows on in conduit 105 to reversing exchanger 23 and functions in the manner above explained.

The withdrawal of the small portion of the residual part of the evaporated, minor flow of nitrogen from passage 27 of exchanger 23 by means of valved conduit 109 is done in order to provide, indirectly, the temperature conditions in reversing exchanger 23 which will permit proper deposition and effective removal of high boiling impurities, such as carbon dioxide. It is to be noted that this withdrawn nitrogen passes through conduit 109 and its control valve 110 and enters the augmented, expanded nitrogen passage 131 of the high pressure nitrogen exchanger 123 at a particular point. This point of introduction corresponds to the location in the exchanger 123 at which the major flow of nitrogen is divided from the compressed full flow for delivery to the nitrogen expander 127.

Referring now to the previously-mentioned argon attachment to the oxygen column, it can be seen that the argon attachment 140 is arranged to withdraw an argon concentrate from the oxygen column 59 at a point about one-third of the distance up from the base of the column. This withdrawn argon passes through passage 142 and enters the argon column 140 which also has the previously-mentioned liquid-vapor contact trays in the major portion thereof. In the top of the column a condenser 144 receives expanded rich liquid produce in the high pressure column 37. By means of condenser 144 and the bubble-cap-tray construction, the argon concentrate is rectified into fairly pure oxygen in the base of the argon column while crude or raw argon (at about −301° F.) containing a small percentage of oxygen is removed from the top of the argon column 140 by conduit 145. Conduit 145 passes the raw argon to the raw argon liquefier 147 which is also cooled by the expanded rich liquid from the high pressure column. The rich liquid for the raw argon liquefier 147 of the argon column flows from the high pressure column 37 through conduit 55 and valve 57 from annular trough 49. This rich liquid is warmed in passing through passage 149 of liquefier 147, counter-currently to the crude argon in passage 151 which is being liquefied. The liquefied argon at about −304° F. is removed by pipe 153 connected to passage 151. The rich liquid passes from liquefier 147 to the condenser 144 of the argon column by means of pipe 155. The rich fluid at about −308° F. is removed from the condenser of the argon column in vapor and liquid phases by conduits 157 and 159 and then passes through conduit 58 into the oxygen column 59 about a third of the way down from the top. The oxygen which collects in the bottom of the argon column 140 is returned to the oxygen column 59 by conduit 161 which extends between the base of the argon column and a point in the oxygen column slightly below where argon concentrate is removed.

In order to maintain an optimum concentration of argon (preferably about 6 per cent) at the point of withdrawal of the argon concentrate, a valved conduit 171 extends between a joint just above the liquid oxygen pool in the bottom of the oxygen column and the waste nitrogen conduit 33. This conduit 171 is used to bleed-off some gaseous oxygen in proper amounts which effects the maintenance of the desired argon concentration at the point of argon withdrawal. The proper bleed-off is controlled preferably by automatic valve 173 in conduit 171. This valve 173 is preferably operated automatically in response to a determination of the composition of the gas at point of withdrawal. The determination of gas composition is made by taking a gas sample from the withdrawal location in the oxygen column 59 by means of valved conduit 175 and passing the sample to a gas analyzer 177 connected to conduit 175. The automatic valve 173 is controlled by the gas analyzer 177 by suitable means 179 shown by a dash-line on the drawing. This method and apparatus for maintaining an optimum concentration of argon at the point of withdrawal in a liquid oxygen column is necessary since only a liquid oxygen product is withdrawn and this interferes with the refrigeration and hence the reflux ratio in the column. For improved argon production the withdrawal of oxygen vapor in a sufficient amount is thus effected so that the proper reflux ratio is maintained for the desired argon concentration.

It is to be noted that the air separation process can be considered as being divided into a high pressure zone which includes high pressure column 37 and a low pressure zone which includes the oxygen column 59 and the oxygen reboiler 63.

The operation of the apparatus and steps of the process are believed to be apparent, to one skilled in the art, from the foregoing description. Some of the noteworthy features which can be further described are the arrangement for obtaining high purity liquid nitrogen and incidentally a gaseous neon fraction, the specific utilization of the nitrogen recycle including the system for "unbalancing" the reversing exchanger, and the means for beneficially affecting the composition of the argon concentration in the liquid oxygen column.

The arrangement for obtaining high purity nitrogen involves passing the entire nitrogen effluent from the top of the nitrogen column 37 through pipe 83 to the nitrogen passage 85 of the oxygen boiler 63 where it is partially condensed. This partially condensed nitrogen is then completely liquefied in nitrogen condenser 89 by heat exchange with the expanded minor flow of recycle nitrogen. Thereafter most (preferably about 97 per cent) of this large quantity of liquid nitrogen or condensed nitrogen effluent is returned to the top of the high pressure rectifying zone or nitrogen column 37 by means of pump 95 and conduit 47 in order to reflux the rectification of air into a high purity nitrogen effluent without the extensive gas-liquid contact and controls. A portion (preferably about 3 per cent) of the liquefied high purity nitrogen is removed from the process after the complete condensation for the various uses which require high purity nitrogen. In this manner, high purity liquid nitrogen is produced simultaneously with high purity liquid oxygen in a plant which is basically a liquid oxygen plant and nitrogen is produced having a purity higher than 99.9 per cent.

In addition to being used to complete the condensation of the high purity nitrogen effluent and hence refrigerate to some extent the process, the nitrogen recycle is used to boil the liquid air in scrubber 39 and to refrigerate the incoming air in reversing exchanger 23 so that the advantages which are inherent in the use of a nitrogen recycle are obtained in an improved manner. It is to be noted that the various divisions and flows of the nitrogen in the recycle provide a flexible and efficient system for placing certain of the recycle flows in condition for accomplishing the foregoing boiling, condensing and refrigerating functions. It is also to be noted that, by having a closed nitrogen cycle, the lubricant contaminants from the cycle compressor 117 do not get into the air flows and cause an explosion hazard and that the cycle can be operated at high pressure. By maintaining the low side of the nitrogen cycle including the expander 127 at about 4 atmospheres, it is possible to get suitable heat transfer and yet the total power requirements of the instant process are not larger than the power required for conventional plants.

The "unbalancing" system in the reversing exchanger 23 is also effected by the nitrogen recycle, in addition to its foregoing functions. Also the overall arrangement is such that the method for unbalancing of the reversing exchanger does not interfere with the proper functioning of the recycle. The unbalancing, to avoid the above-mentioned plugging in the reversing exchanger which removes high boiling constituents from air, is accomplished by bleeding off a small amount of the minor part of recycle nitrogen from non-reversing passage 27 of reversing exchanger 23. This bleed-off occurs at a point about a third of the length of exchanger from the warm end of the exchanger. In this manner, the temperature levels in the other two passages of the exchanger are made suitable so that the deposition of high boiling constituents from incoming air and the removal of the deposits by the waste nitrogen upon reversal is properly effected. The temperatures in the three passages 27, 21 and 25 of the reversing exchanger at recycle nitrogen bleed-off are respectively about −60° F., −50° F. and −60° F. when air is flowing in passage 21. Interference with the nitrogen recycle is avoided by introducing this nitrogen bleed-off into the recycle exchanger 123 at the point where the major flow is divided out and passes to the expander 127.

It is also to be noted that, with the instant separated arrangement of apparatus, a large capacity, high purity plant has been provided which does not have an excessive height and hence does not involve the construction of high shelters for the plant. The separated units, including the high pressure column 37, oxygen column 59, reboiler 63 and condenser 89 also are more easily fabricated, erected, and accessible for repair than most conventional apparatus.

The means for beneficially affecting the composition of argon concentrate in the liquid oxygen column involves bleeding off some gaseous oxygen from a point just above the pool of liquid oxygen, so that a reflux ratio results at the point of withdrawal of the argon concentrate which is conducive to the desired optimum concentration of argon. When factors such as the variable withdrawal of high purity liquid nitrogen through pipe 97 as above mentioned in column 5, other than the normal upset of the proper reflux ratio due to withdrawal of liquid oxygen, cause a deviation from the desired composition, it is possible to compensate for this deviation by increasing or decreasing the quantity of the withdrawn gaseous oxygen so that the desired optimum composition exists at the point of withdrawal. By sampling and analyzing the argon concentrate and regulating the gaseous oxygen bleed-off in response to the analysis, this compensation and optimum concentration is effected in a simple manner with an effect on the high purity liquid oxygen production which can be tolerated.

Another notable feature is the condensation of the gaseous crude oxygen by heat exchange with rich liquid so that the crude argon is in a form which can be stored without requiring a large volume.

From the foregoing it is apparent that the instant invention provides an improved apparatus and process for the simultaneous production of high purity liquid oxygen and limited amounts of high purity liquid nitrogen in an efficient and economical manner. In addition, the nitrogen recycle which is utilized in accomplishing the preceding result is also used to prevent plugging of the reversing exchanger and is instrumental in providing an apparatus arrangement which facilitates repairs and does not require high protective buildings. It is also evident that provision for obtaining and maintaining a desired concentration of argon in a liquid oxygen column has been devised, along with means for obtaining crude argon as a liquid so that it is suitable for liquid storage.

It is to be understood that the person skilled in the art can make changes in the instant invention as herein disclosed in its preferred form without departing from the invention as defined in the following claims.

I claim:

1. In an air separation process which produces principally high purity liquid oxygen and has a high pressure rectifier having an upper set of contact trays and a low pressure rectifier, the improvement for producing high purity nitrogen comprising condensing all of the nitrogen effluent from said high pressure rectifier, removing a small part of said condensed effluent as a product from the separation process, introducing the remainder of said condensed effluent into said high pressure rectifier above said upper set of contact trays as reflux, removing liquid nitrogen from a location immediately below said set of contact trays of said high pressure rectifier and delivering the liquid nitrogen so removed as reflux to the low pressure rectifier.

2. The method of producing high purity liquid nitrogen in the low temperature rectification of air into a liquid oxygen product comprising separating refrigerated air into a nitrogen effluent, ascending vapors and oxygen-enriched liquid air in a high pressure rectifier, removing and separating said oxygen-enriched liquid air into liquid oxygen and waste nitrogen in a low pressure zone, removing said nitrogen effluent from said high pressure rectifier, partially condensing said nitrogen effluent by heat exchange with said liquid oxygen, withdrawing portions of said liquid oxygen as a product from said low pressure zone, completely condensing said partially-condensed nitrogen effluent by heat exchange with a cold refrigerating fluid, removing a small part of said completely condensed nitrogen effluent as a liquid nitrogen product and introducing the remainder of said completely condensed nitrogen effluent into the top of said high pressure rectifier as a descending reflux liquid, effecting vapor-through-liquid contacts between said reflux liquid and said ascending vapors so that the nitrogen effluent at the top of said high pressure rectifier has a high purity, removing part of said reflux liquid immediately after it has passed through said contacts and using said removed part as reflux in said step of separating said oxygen-enriched liquid air.

3. The method according to claim 2 and being further characterized in that said refrigerating fluid for completely condensing said nitrogen effluent is an expanded nitrogen stream of a nitrogen cycle.

4. In an air separation process which produces oxygen-enriched liquid air, ascending vapors, and nitrogen effluent in a high pressure rectifier and produces liquid oxygen and waste nitrogen gas in a low pressure rectifier, the improvement for producing high purity nitrogen comprised of condensing said nitrogen effluent to form a condensed effluent by indirect heat exchange with said liquid oxygen and then with a cold refrigerating fluid, introducing said condensed effluent into the top of said high pressure rectifier as descending reflux liquid, effecting vapor-through-liquid contacts at successive vertical levels in the top part of said high pressure rectifier between said ascending vapors and said descending reflux liquid to form a nitrogen effluent of high purity and liquid nitrogen of less purity than said nitrogen effluent, collecting said liquid nitrogen at a level adjacent but below where said successive vapor-through-liquid contacts are effected, delivering said collected liquid nitrogen to the top of said low pressure rectifier for refluxing, removing a small part of said high purity effluent as a product, and withdrawing said liquid oxygen as a liquid product after said heat exchange with said nitrogen.

5. The improved process according to claim 4 and further including the feature that said indirect heat exchange between said nitrogen effluent and said refrigerating fluid is effected so that neon is separated from said nitrogen effluent.

6. Apparatus for separating air into high purity liquid nitrogen comprised of a high pressure nitrogen rectifier having vertically-spaced contact trays and a collecting device for oxygen-enriched air below said trays, said collecting device being connected to an intermediate level of a low pressure oxygen rectifier by a conduit for oxygen-enriched air having an expansion valve, an oxygen reboiler having an interior passage for high pressure nitrogen effluent connected by a conduit to an outlet for high pressure nitrogen effluent in the top of said nitrogen rectifier, said oxygen reboiler being connected by conduits to the bottom portion of said oxygen rectifier in such a manner as to receive liquid oxygen by gravity and to return vaporized oxygen to said oxygen rectifier and having a liquid oxygen product outlet, said interior passage for nitrogen effluent in said oxygen reboiler being connected by a conduit to a condenser for completing condensation of said nitrogen effluent from said nitrogen rectifier, means including a liquefied gas pump and a liquid nitrogen product outlet extending between the bottom of said condenser and the top of said nitrogen rectifier for delivering condensed nitrogen effluent from said condenser to the top of said nitrogen rectifier, liquid nitrogen collecting means positioned in said nitrogen rectifier below the top thereof and above said oxygen collecting device, and said liquid nitrogen collecting means being connected to the top of said oxygen rectifier by a conduit.

7. In an air separation process in which a quantity of a liquid air fraction is collected and a nitrogen effluent is formed in a high pressure separation zone having a rectifier and a quantity of liquid oxygen is collected and waste nitrogen is formed in a low pressure separation zone, the improvement comprising boiling said liquid air fraction by heat exchange with a relatively warm, high pressure recycle nitrogen stream, expanding said recycle nitrogen stream into an expanded recycle nitrogen stream, condensing said nitrogen effluent from said high pressure zone by heat exchange with said liquid oxygen in said low pressure zone and said expanded recycle nitrogen stream to form condensed nitrogen effluent, removing a small part of said condensed nitrogen effluent from the process as a product, introducing the remainder of said condensed nitrogen effluent as reflux into the top of said rectifier immediately below where said nitrogen effluent is formed, and removing liquid nitrogen from said rectifier at an intermediate level.

8. The improved process according to claim 7 and further including the feature that said expanded recycle nitrogen, after said heat exchange with said nitrogen effluent is used, together with said waste nitrogen, to refrigerate the air which is separated in the process.

9. A process for separating air containing high boiling point impurities to obtain a krypton-xenon liquid containing the high boiling point impurities and oxygen-enriched liquid air comprising refrigerating and introducing said air into a scrubber section containing contact trays at a point below said contact trays to form liquid air, boiling said liquid air with a recycle nitrogen stream to form ascending vapors, scrubbing said ascending vapors with oxygen-enriched liquid air whereby said boiling air is converted into a krypton-xenon liquid containing said impurities in the bottom of said scrubber section, passing said scrubbed ascending vapors to a rectification section containing contact trays which is refluxed with liquid nitrogen, separating said scrubbed vapors into nitrogen effluent and oxygen-enriched liquid air, introducing a small part of said separated oxygen-enriched liquid air into said scrubber section above said contact trays to provide the oxygen-enriched air for said scrubbing step, passing the remainder of said oxygen-enriched air to a low-pressure rectifier for separation into waste nitrogen and oxygen, and continuously removing portions of said krypton-xenon liquid from the lowest part of said scrubber section.

10. The method of obtaining liquid argon and liquid oxygen from air by low temperature rectification comprising separating air into oxygen-enriched liquid air and nitrogen effluent in a high pressure rectifier, separating said oxygen-enriched liquid air into a liquid oxygen product, waste nitrogen and intermediate vapors in which argon is concentrated in a low pressure oxygen rectifier, separating said intermediate vapors in which argon is concentrated into argon-rich vapors and oxygen-rich liquid in an argon column, returning said oxygen-rich liquid to said step of separating said oxygen-enriched liquid air, concentrating the argon content of said argon-rich vapors by condensing the less volatile oxygen component and thus forming an argon effluent of high argon content, liquefying said argon effluent exteriorly of said argon column by heat exchange with said oxygen-enriched air after expansion thereof and before the separation thereof, and utilizing said oxygen-enriched air after said heat exchange with said argon effluent to effect said concentration of said argon-rich vapors by condensing the less volatile oxygen.

11. The method of separating air to obtain liquid oxygen as a product comprised of compressing air to about 100 p. s. i. a., refrigerating said compressed air by heat exchange with waste nitrogen and a cold stream of recycle nitrogen to about −280° F., scrubbing said air with oxygen-enriched liquid to form oxygen-enriched vapors and a liquid air fraction, boiling said liquid air fraction by indirect heat exchange with a relatively warm, high pressure stream of recycle nitrogen which is thus liquefied, separating said oxygen-enriched vapors into nitrogen effluent and oxygen-enriched liquid, expanding and separating said oxygen-enriched liquid into waste nitrogen and a liquid oxygen product, partially condensing said nitrogen effluent by heat exchange with said liquid oxygen product, completely condensing said nitrogen effluent by heat exchange with said liquefied stream of recycle nitrogen after the expansion thereof to form an evaporated cold gas flow of recycle nitrogen, dividing said evaporated gas flow of recycle nitrogen into two parts, moving one of said parts into heat exchange with a compressed warm flow of recycle nitrogen and using the other of said parts of said evaporated flow of recycle nitrogen and said waste nitrogen to provide said waste nitrogen and said cold stream of recycle nitrogen in said step of refrigerating said compressed air.

12. In an air separation process which uses a high pressure rectifier, a nitrogen recycle and a reversing exchanger the improvement comprising compressing recycle nitrogen to form a compressed nitrogen stream, expanding part of said compressed nitrogen stream to form a recycle cooling stream and a divisional compressed stream, effecting heat exchange between said recycle cooling stream and both said divisional compressed stream and said compressed stream, cooling said divisional compressed recycle stream by indirect heat exchange with a liquid air fraction produced in said high pressure rectifier to form a cold recycle stream, refrigerating air at about 100 p. s. i. a. in said reversing exchanger to about −280° F. by passing waste nitrogen formed in the process through said reversing exchanger countercurrently to said air and by passing said cold recycle in countercurrent indirect heat exchange with said compressed air through the length of said reversing exchanger, bleeding off a small portion of said cold recycle stream at a point about a third of the distance from the warm end of said reversing exchanger and introducing said small portion, said cold recycle stream and said recycle cooling stream into said step of compressing.

13. In an air separation process having a liquid oxygen column which collects a pool of liquid oxygen in the bottom thereof and an argon column connected by passage means to the liquid oxygen column at a location appreciably above said pool, the improved method of operation which includes withdrawing continuously gaseous nitrogen from the top of the liquid oxygen column, withdrawing continuously the produced liquid oxygen from said pool of liquid oxygen in the bottom of the liquid oxygen column and delivering said withdrawn liquid oxygen as a liquid oxygen product, withdrawing a small amount of liquid nitrogen from the process whereby the amount of reflux liquid to the oxygen column is varied and further whereby the argon concentration level in the oxygen column is varied, withdrawing continuously an argon-rich fraction through said passage means to said argon column rectifying said argon-rich fraction into gaseous argon and oxygen-rich liquid returning said oxygen-rich liquid through said passage means to said liquid oxygen column, and removing continuously a small quantity of gaseous oxygen from said liquid oxygen column from a location immediately above said pool of liquid oxygen whereby the level of argon concentration in said oxygen column is maintained at the location of said argon withdrawal passage means.

14. In a method for separating air into an oxygen product and gaseous crude argon which uses a high pressure rectifier to produce oxygen-enriched liquid air, a low pressure oxygen column to rectify the enriched liquid air and an argon column attached to the oxygen column to produce the gaseous crude argon, the improvement which comprises using the oxygen-enriched liquid air from the high pressure rectifier to liquefy the gaseous crude argon into a liquid phase product, then utilizing the oxygen-enriched liquid air to absorb heat in the top of the argon column, whereby crude argon having a high percentage of argon is produced and then delivered in liquid phase, utilizing a closed nitrogen recycle to effect boiling and condensing of fluids invloved in the rectification in the high pressure rectifier by bringing a suitable recycle nitrogen into heat exchange with liquid and vapors produced in the high pressure rectifier and transferring heat from incoming air to said closed nitrogen recycle by placing a suitable recycle flow and the incoming air in heat exchange relation.

15. Apparatus for the separation of air including a closed nitrogen recycle having a compressor, a reversing heat exchanger having reversing passages for the flow of air and waste nitrogen and a non-reversing passage for recycle nitrogen extending through said exchanger and suitably connected into said recycle, a bleed-off conduit connected to said non-reversing passage at a point about one-third of the distance from the air inlet end of said reversing exchanger and extending to a suitable point in said nitrogen recycle, said closed nitrogen recycle including a heat exchanger having a high pressure passage and a low pressure passage, an expansion engine connected to said high pressure passage by means of a conduit, and the said suitable point in the nitrogen recycle, to which the bleed-off conduit from the reversing exchanger extends, being in said low pressure passage adjacent the location at which the conduit leading to the expansion engine is connected to the high pressure passage of the nitrogen recycle heat exchanger.

16. An air separation process for producing liquid oxygen, liquid nitrogen, and liquid argon comprised of refrigerating compressed air to about its liquefaction temperature, separating said air into nitrogen effluent, oxygen-enriched liquid air and a liquid air fraction in a high pressure rectifier, boiling said liquid air fraction with a compressed warm recycle nitrogen stream which is thus cooled, separating said oxygen-enriched air into waste nitrogen, crude argon and liquid oxygen product in a low pressure rectifier, condensing said nitrogen effluent from said high pressure rectifier by heat exchange with said liquid oxygen product and said cooled recycle nitrogen stream after the expansion thereof, removing a small part of said condensed nitrogen effluent from the process as a liquid nitrogen product, introducing the remainder of said condensed nitrogen effluent as reflux into the top of said high pressure rectifier, separating said crude argon into argon vapors and liquid oxygen in an argon column, using said oxygen-enriched liquid air, after expansion and before the separation thereof, to liquefy said argon vapors into a liquid argon product and then to condense less volatile vapors in the top of said argon column, removing liquid nitrogen from an intermediate level of said high pressure rectifier and introducing said removed liquid nitrogen as reflux into the top of said low pressure rectifier, and using said waste nitrogen and said recycle nitrogen stream, after use in said step of condensing, in said step of refrigerating compressed air.

References Cited in the file of this patent

UNITED STATES PATENTS

| Number | Name | Date |
|---|---|---|
| 1,449,291 | Mewes | Mar. 20, 1923 |
| 1,594,336 | Mewes | July 27, 1926 |
| 2,284,662 | Kahle | June 2, 1942 |
| 2,409,458 | Van Nuys | Oct. 15, 1946 |
| 2,411,711 | De Baufre | Nov. 26, 1946 |
| 2,413,752 | Dennis | Jan. 7, 1947 |
| 2,417,279 | Van Nuys | Mar. 11, 1947 |
| 2,423,274 | Van Nuys | July 1, 1947 |
| 2,424,201 | Van Nuys | July 15, 1947 |
| 2,433,508 | Dennis | Dec. 30, 1947 |
| 2,433,536 | Van Nuys | Dec. 30, 1947 |
| 2,482,304 | Van Nuys | Sept. 20, 1949 |
| 2,496,380 | Crawford | Feb. 7, 1950 |
| 2,497,589 | Dennis | Feb. 14, 1950 |
| 2,527,623 | Fausek | Oct. 31, 1950 |
| 2,547,177 | Simpson | Apr. 3, 1951 |
| 2,586,811 | Garbo | Feb. 26, 1952 |
| 2,599,133 | Schilling | June 3, 1952 |
| 2,603,956 | Borchardt | July 22, 1952 |
| 2,608,070 | Kapitza | Aug. 26, 1952 |
| 2,627,731 | Benedict | Feb. 10, 1953 |
| 2,698,523 | Hnilicka | Jan. 4, 1955 |
| 2,699,046 | Etienne | Jan. 11, 1955 |
| 2,700,282 | Roberts | Jan. 25, 1955 |